United States Patent [19]

Shimon et al.

[11] Patent Number: 5,660,115
[45] Date of Patent: Aug. 26, 1997

[54] VERTICALLY ACTUATED RAIL GUIDE WHEELS

[75] Inventors: David J. Shimon, Fairmont, Minn.; Harry Madison, Memphis, Tenn.

[73] Assignee: Harsco Corporation, Camp Hill, Pa.

[21] Appl. No.: 549,159

[22] Filed: Oct. 27, 1995

[51] Int. Cl.$^6$ .................................................. B61D 15/00
[52] U.S. Cl. ............................................................ 105/72.2
[58] Field of Search ............................... 105/72.2, 215.1, 105/215.2

[56] References Cited

U.S. PATENT DOCUMENTS

| | | | |
|---|---|---|---|
| 3,653,332 | 4/1972 | Olson et al. | 105/72.2 |
| 3,763,789 | 10/1973 | Olson et al. | 105/72.2 |
| 3,804,025 | 4/1974 | Elliott | 105/72.2 |
| 3,945,326 | 3/1976 | Seifert | 105/72.2 |
| 4,583,465 | 4/1986 | Powell, Sr. | |
| 5,154,124 | 10/1992 | Madison | |
| 5,186,109 | 2/1993 | Madison | |

*Primary Examiner*—Mark T. Le
*Attorney, Agent, or Firm*—Eckert Seamans Cherin & Mellott

[57] ABSTRACT

A rail guide wheel arrangement provides movement of rail wheels between rail and road positions with a compact zone of movement such that no open zone is required in front or behind the apparatus to accommodate such movement. The movement of rail wheels and a wheel support has no component of movement in the rail direction. Side shifting of the guide wheel unit can be controlled by control arrangement using a single joystick to control two actuators. A suspension is provided using two spring cells. An axle may include cavities to receive the spring cells when the apparatus is in its road position. A locking arrangement uses pilot operated check valves and secondary mechanical locks.

27 Claims, 16 Drawing Sheets

VERTICALLY ACTUATED RAIL GUIDE WHEELS

BACKGROUND OF THE INVENTION

The present invention relates to a rail engagement apparatus having rail engagement wheels for a road vehicle. More specifically, the rail engagement apparatus is relatively compact in movement. Further, this invention relates to a vehicle having such an apparatus mounted to it.

As used herein, a road vehicle is a vehicle having wheels which contact a highway or other road, as opposed to only having wheels which roll on rails on a railroad track.

Railroad service crews often have to go to various places along a railroad track in order to make repairs and inspections. Depending upon the type of service which is performed and other factors, the service crew may ride to the work site using a rail vehicle or using a road vehicle, such as a truck or car. Since the best way to a work site may include travel along a road and travel along a railway, service crews and other rail workers often have used road vehicle having a rail engagement or guide wheel apparatus mounted on them. Such cars or trucks may travel along a highway or other road with road wheels engaging the road. Upon getting to an appropriate place along the railway, the rail engagement apparatus is operated such that front and back pairs of railway wheels are lowered from the vehicle until the vehicle is bound to the railway. When the operator wants the vehicle to leave the railway, the two front railway wheels and the two rear railway wheels are retracted or lifted up such that the vehicle may again run along the road.

Various structures have been used to allow railway wheels to be attached to road vehicles. Although such structures have been generally useful at moving the railway wheels between an upper position in which the vehicle may travel along a highway or other road and a lower position in which the vehicle travels along a railway, such structures have often been subject to one or more of several disadvantages.

Some prior structures do not always maintain sufficient contact between the rails and the rail wheels. Thus, driving the vehicle faster than is safe may risk derailment upon irregularities in the rails. Many prior structures require a significant clearance zone to allow the rail wheels to move between rail and road positions. Such a clearance zone requirement may limit the type of vehicle on which the equipment is mounted and may limit the mounting position on a particular vehicle. Some such structures require precise vehicle positioning before initially engaging rail wheels with the rails. Slight mispositioning of the vehicle may require that the vehicle be moved using the road wheels before making a second attempt to engage the rail wheels. Some structures may have ability to move relative to the vehicle to which they are mounted for centering, but that ability may be limited in flexibility such as requiring movement of both rail wheels in a pair in the same direction at the same time. Some prior designs use plural controls which require two hands of a human operator or coordinated action by hands of different human operators. Some prior designs may use suspension systems which limit the ground clearance of the vehicle.

The prior U.S. Pat. Nos. 5,154,124, issued Oct. 13, 1992, and 5,186,109, issued Feb. 16, 1993, both in the name of Harry Madison, one of the inventors of the present invention, both assigned to the assignee of the present application, both relate to different rail guide wheel apparatus for moving a highway vehicle along a railroad track. Both of those patents are hereby incorporated by reference.

OBJECTS AND SUMMARY OF THE INVENTION

Accordingly, it is a primary object of the present invention to provide a new and improved rail guide wheel apparatus.

A more specific object of the present invention is to provide a rail guide wheel apparatus which maintains contact between the guide wheels and the rails.

A further object of the present invention is to provide a rail guide wheel apparatus which provides a very compact zone of movement of the guide wheels as they move between rail and road positions.

Yet another object of the present invention is to provide a rail guide wheel apparatus which has minimal clearance requirements for the operation of the apparatus. That is, the apparatus may work without placing substantially limiting additional clearance requirements on the vehicle.

A further object of the present invention is to provide a rail guide wheel apparatus which has an improved control arrangement.

Yet another object of the present invention is to provide a rail guide wheel apparatus which has a suspension arrangement without significantly limiting the ground clearance of the vehicle when the vehicle travels on a highway or other road.

A further object of the present invention is to provide a rail guide wheel apparatus which has an improved lock arrangement.

A further object of the present invention is to provide a rail guide wheel apparatus which has an improved axle arrangement.

The above and other features of the present invention which will be more readily understood when the following detailed description is considered in conjunction with the accompanying drawings are realized by rail guide wheel apparatus for a road vehicle having road wheels. A mount frame is adapted to be mounted to the road vehicle and having opposite first and second ends. A wheel support has first and second rail wheels mounted at opposite respective first and second ends thereof, the wheel support supported by the mount frame to allow relative movement therebetween. A mode activator is supported by the mount frame and operable to move the wheel support between:

I. a lower position in which the first and second rail wheels engage rails; and

II. an upper position in wherein the first and second rail wheels are sufficiently raised for allowing the road vehicle to travel on a road.

The mode activator includes extendable first and second actuators for changing the wheel support between its lower and upper positions. The first actuator has a wheel support end operably connected adjacent the first end of the wheel support and has a frame end operably connected adjacent the second end of the mount frame. The second actuator has a wheel support end operably connected adjacent the second end of the wheel support and has a frame end operably connected adjacent the first end of the mount frame. The first and second actuators extend across each other when viewed in a rail direction.

The rail guide wheel apparatus further includes a suspension operably connecting the wheel support to the mount frame, the suspension serving as a suspension for the vehicle only when the first and second rail wheels are engaged to rails. The mode activator is operable to vertically move the wheel support between its lower and upper positions. As used herein, vertical movement is movement straight up or straight down. The present invention is capable of such vertical movement of the wheel support, although it may also provide side shifting as desired. The vertical movement of the wheel support between its lower and upper positions corresponds respectively to movement of the suspension between:

an operating mode in which the suspension is oriented relative to the wheel support such that the suspension dampens vibrations from engagement of the first and second rail wheels with rails; and a non-operating mode in which the suspension is oriented relative to the wheel support differently from its orientation in the operating mode.

A joystick is operably connected to control both of the first and second actuators for changing the wheel support between its upper and lower positions. The wheel support includes an axle having at least one lengthwise extending cavity therein, and further includes first and second members operably connecting the wheel support to the mount frame, each of the first and second members having substantial portions disposed within the axle when the wheel support is in its upper position, and wherein at least part of the substantial portions are outside of the axle when the wheel support is in its lower position. The first actuator has its frame end pivotably fixed to a point on the mount frame and the second actuator has its frame end pivotably fixed to a point on the mount frame. First and second members operably connect the wheel support to the mount frame and each having a lower end pivotably connected to the wheel support. The first actuator has its wheel support end pivotably connected to the wheel support by way of the first member, and the second actuator has its wheel support end pivotably connected to the wheel support by way of the second member. Each of the first and second members is a spring cell. First and second links have upper ends respectively pivotably mounted at the first and second ends of the mount frame, the first link having a lower end pivotably connected to the wheel support end of the second actuator, and the second link having a lower end pivotably connected to the wheel support end of the first actuator. The rail guide wheel apparatus is combined with a road vehicle, the mount frame being mounted to the road vehicle.

The present invention may alternately be described as a rail guide wheel apparatus for a road vehicle having road wheels having a mount frame, wheel support, and mode activator as described above. A suspension is operably connecting the wheel support to the mount frame, the suspension serving as a suspension for the vehicle only when the first and second rail wheels are engaged to rails. The mode activator is operable to vertically move the wheel support between its lower and upper positions, which vertical movement of the wheel support between its lower and upper positions corresponds respectively to movement of the suspension between:

an operating mode in which the suspension is oriented relative to the wheel support such that the suspension dampens vibrations from engagement of the first and second rail wheels with rails; and a non-operating mode in which the suspension is oriented relative to the wheel support differently from its orientation in the operating mode.

The mode activator includes extendable first and second actuators for changing the wheel support between its lower and upper positions, the first actuator having a wheel support end operably connected to the wheel support and having a frame end operably connected to the mount frame, the second actuator having a wheel support end operably connected to the wheel support and having a frame end operably connected to the mount frame. A joystick is operably connected to control both of the first and second actuators for changing the wheel support between its upper and lower positions. The suspension includes first and second spring cells, the first spring cell has a lower end pivotably connected to the first end of the wheel support, and the second spring cell has a lower end pivotably connected to the second end of the wheel support. The first spring cell is pivotably connected to the wheel support to pivot about a horizontal, rail direction first axis relative thereto, and the second spring cell is pivotably connected to the wheel support to pivot about a horizontal, rail direction second axis relative thereto. The wheel support includes an axle having at least one lengthwise extending cavity therein, and wherein each of the first and second spring cells have substantial portions disposed within the axle when the wheel support is in its upper position, and wherein at least part of the substantial portions are outside of the axle when the wheel support is in its lower position. The first actuator has its wheel support end pivotably connected to the wheel support by way of the second spring cell, and wherein the second actuator has its wheel support end pivotably connected to the wheel support by way of the first spring cell.

The present invention may alternately be described as a rail guide wheel apparatus for a road vehicle having road wheels having a mount frame, wheel support, and mode activator as described above. The mode activator includes extendable first and second actuators for changing the wheel support between its lower and upper positions. The first actuator has a wheel support end operably connected to the wheel support and has a frame end operably connected to the mount frame. The second actuator has a wheel support end operably connected to the wheel support and has a frame end operably connected to the mount frame. An angular control device is operably connected to control both of the first and second actuators for changing the wheel support between its upper and lower positions. As used herein, an angular control device means a joystick, a mouse (as used with a computer), a track ball, or similar input device allowing a human operator to input an angular value. The angular control device is operable for side shifting of the wheel support in a direction transverse to the rail direction. Preferably, the angular control device is a joystick. The angular control device precludes retraction of either of the first and second actuators during extension of the other of the first and second actuators and precludes extension of either of the first and second actuators during retraction of the other of the first and second actuators.

The present invention may alternately be described as a rail guide wheel apparatus for a road vehicle having road wheels having a mount frame, wheel support, and mode activator as described above. The wheel support includes an axle having at least one lengthwise extending cavity therein. First and second members operably connect the wheel support to the mount frame, each of the first and second members having substantial portions disposed within the axle when the wheel support is in its upper position, and wherein at least part of the substantial portions are outside of the axle when the wheel support is in its lower position.

The first member is a first spring cell and the second member is a second spring cell. The mode activator is operable to vertically move the wheel support between its lower and upper positions, which vertical movement of the wheel support between its lower and upper positions corresponds respectively to movement of the each of the first and second spring cells between:

an operating mode in which each of the first and second spring cells is oriented relative to the wheel support to dampen vibrations from engagement of the first and second rail wheels with rails; and a non-operating mode in which each of the first and second spring cells is oriented relative to the wheel support differently from its orientation in the operating mode.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
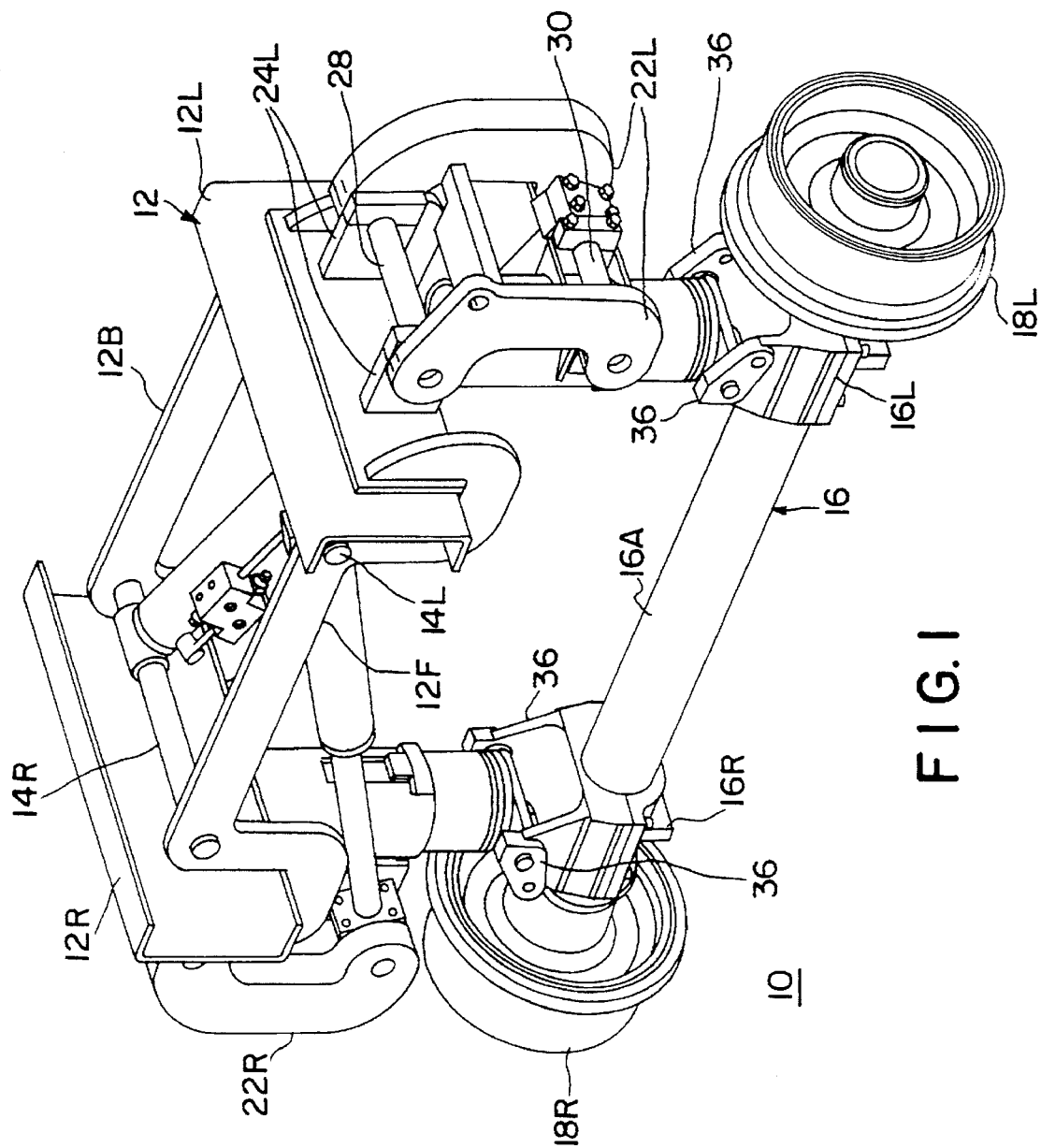
FIG. 1 is a perspective view of a first embodiment rail guide wheel apparatus of the present invention.
Figure 2:
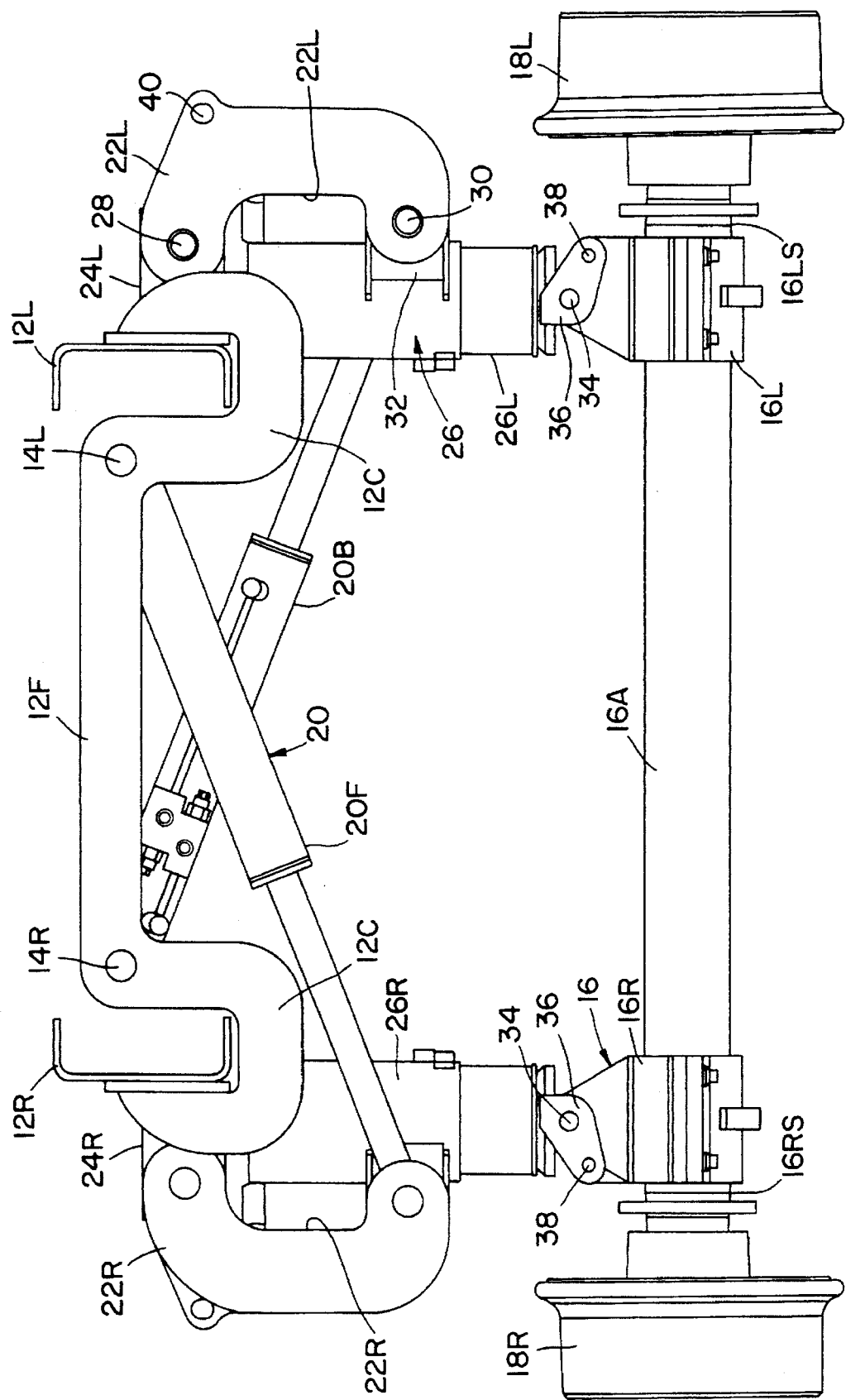
FIG. 2 is a front view of the apparatus of FIG. 1.

A first embodiment rail guide wheel apparatus 10 according to the present invention is shown in FIGS. 1 and 2. The apparatus 10 attaches to left and right side members 12L and 12R, only partially shown, of a road vehicle frame. Apparatus 10 includes a mount frame 12 having front and back cross members 12F and 12B. The mount frame 12 will be fixed to the frame of a road vehicle. Extending between the front and back members 12F and 12B are parallel right and left rods 14R and 14L.

Disposed below the mount frame 12 and movably supported thereby is a wheel support 16 having axle 16A, right and left clamps 16R and 16L (each consisting of two pieces bolted together to firmly grip the axle 16A), and right and left spindles 16RS and 16LS. Right and left flanged steel rail engagement wheels 18R and 18L are respectively mounted to the spindles 16RS and 16LS in known fashion. The wheel support 16 and wheels 18R and 18L are movable up and down relative to the mount frame 12 such that the apparatus may be disposed in a rail mode with the wheel support in a lower position and the wheels 18R and 18L engaged to rails (rails not shown) and the apparatus may be disposed in a road or highway mode with the wheel support 16 in an upper position with the wheels 18R and 18L elevated from a road or highway such that the vehicle (not shown) would proceed on road tires.

A mode activator 20 includes front and back extendable actuators 20F and 20B, which are preferably hydraulic cylinder actuators as shown. The mode activator 20 and its two actuators 20F and 20B are used to move the wheel support 16 between its upper and lower positions. (Wheel support 16 is shown in its lower position in both FIGS. 1 and 2.)

Right and left pairs of C links 22R and 22L are pivotably mounted to flanges 24R and 24L, which flanges are fixed relative to mount frame 12 and the vehicle frame. For ease of discussion, various front and back components are identical or mirror images of each other and various right and left components are identical or mirror images of each other. Therefore, only some of the components need be shown and discussed since the structure and operation of the others will be apparent from the illustrated and discussed components. A suspension 26 includes right and left spring cells 26R and 26L, which spring cells may be of the commercially available type described in the incorporated by reference U.S. Pat. No. 5,186,109.

Left links 22L pivot about axle 28 when the length of actuator 20B is changed. Specifically, when actuator 20B is reduced in length from its FIG. 2 position, left links rotate clockwise (relative to the FIG. 2 view) about axle 28 since the lower end of actuator 20B is rotably secured to axle 30. Spring cell 26L has bracket 32 fixed to it and pivotably attached to axle 30 such that spring cell 26L rotates counterclockwise (in view of FIG. 2) relative to axle 30. Spring cell 26L further rotates counterclockwise about axle 34 relative to wheel support 16 as the lower end of spring cell 26L is pivotably connected to axle 34, which axle in turn is mounted to two plates 36. Spring cell 26L rotates between plates 36 counterclockwise with the axle also being pivotably connected to axle clamp 16L. If actuator 20F is retracted at the same time as actuator 20B, both sides of wheel support 16 will be lifted until the cavities 22C of links 22R and 22L have respectively seated around members 12R and 12L. As shown in FIG. 2, member 12F has an upper run 12N with C shaped portions 12C at each end, each C shaped portion having its cavity wrapped around one of members 12R and 12L. When the wheel support 16 is fully retracted to its upper position, the cavities 22C will be wrapped around those members in similar fashion. When in the road or upper position, the wheel support 16 may be secured in place using lock pins (not shown) to secure lock pin holes 38 with the corresponding side holes 40 of links 22R and 22L.

When the wheel support 16 is in its illustrated lower or rail position, the suspension 26 of spring cells 26R and 26L are vertical and in operating positions as opposed to the non-operating substantially horizontal positions which they assume when the actuators 20F and 20B are retracted. Importantly, when the wheel support 16 and wheels 18R and 18L are moved between their upper road positions and their lower or rail positions, they move vertically, meaning that they have the ability to move straight up and straight down. The present invention doesn't require an open zone in front or behind the unit to avoid interference. The importance of this feature may best be understood from viewing FIGS. 3 and 4 of the incorporated by reference U.S. Pat. No. 5,186,109 which shows the use of a wheel support which swings from upper to lower position. In that case, the apparatus requires an open zone in front of it such that it will not hit anything when swinging the wheels and their support. In contrast to the movement of that prior apparatus in the rail direction (i.e., parallel to the rails), the present invention provides movement of the wheels and their support 16 between upper and lower positions without any movement components in the rail direction. Although the present invention allows straight up and straight down movement of the wheels and support 16, it also will allow side shifting to line up wheels 18R and 18L with rails therebelow. Such side shifting will be discussed in detail below, but involves movements including horizontal components transverse to the rail direction and without any components parallel to the rail direction. Advantageously, the present invention may provide the straight up and straight down movement of the rail wheels 18R and 18L and the wheel support 16 even though a suspension is built into the apparatus.

Figure 3:
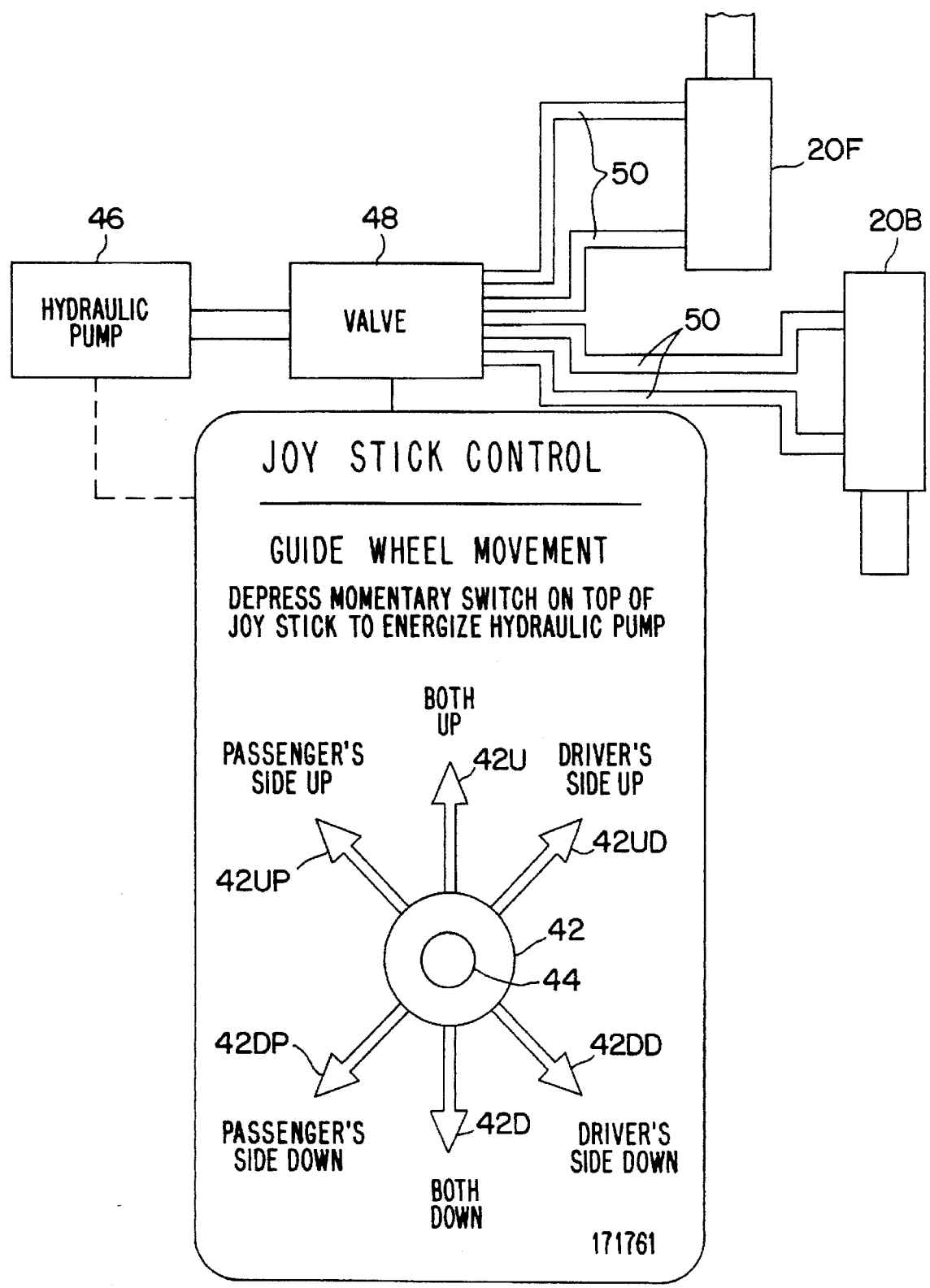
FIG. 3 is a block diagram of a joystick control arrangement.

Turning now to FIG. 3, a simplified block diagram shows a joystick 42 and associated components used to control the actuators 20F and 20B. The joystick 42 has a push button momentary switch 44 on top thereof for energizing a pump 46 to begin pumping hydraulic fluid. Valve 48 has pipes 50 connected to the rod and cylinder ends of the double acting actuators 20F and 20B. Various known valving arrangements may be used for the valve 48 to operate in the following manner. For example, a commercially available Vickers HRC (hydraulic remote control) valve may be used.

When the joystick 42 is pushed up corresponding to direction 42U, both actuators 20F and 20B will retract such that wheel support 16 and wheels 18R and 18L (not in FIG. 3) will be lifted straight up. When the joystick 42 is pushed down corresponding to direction 42D, both actuators 20F and 20B will extend such that wheel support 16 and wheels 18R and 18L (see FIG. 2, not in FIG. 3) will be lowered straight down.

When the joystick 42 is pushed in the down-driver's side corresponding to direction 42UD, only actuator 20B will extend such that only the driver's side (i.e., left side, adjacent wheel 18L) of wheel support 16 is lowered, without lowering the passenger or right side of wheel support 16. This effectively side shifts (causes movement having a horizontal component perpendicular to the rail direction) the wheel support 16 and wheels to the right. Such side shifting allows the operator to drive a road vehicle to approximate center over a pair of rails and compensate for errors by shifting the wheel support right or left as needed until a rail wheel flange catches on a rail. At that point moving the joystick in direction 42D completes the lowering of the wheel support 16. Since the wheel flange is constrained to the rail, this lowering will slightly shift the whole road vehicle until it is centered over the rails.

Side shifting to the left is accomplished by pushing joystick 42 in the down-passenger's side corresponding to direction 42DP in which case only actuator 20F is extended. Side shifting to the left may also be accomplished by pushing joystick 42 in the up-driver's side corresponding to direction 42UD in which case only actuator 20B is retracted. Side shifting to the right may also be accomplished by pushing joystick 42 in the up-passenger's side corresponding to direction 42UD in which case only actuator 20F is retracted. Thus, each of the directions 42UD, 42UP, 42DP, and 42DD correspond to activation of only one of the two actuators 20F and 20B.

It should be appreciated that the joystick is not limited to the six illustrated directions. Pushing the joystick in a direction between 42U and 42UD will cause the lifting of both sides of the wheel support 16 with the driver's side being lifted faster to cause a side shifting, for example. Taking another example, pushing the joystick exactly midway between directions 42UD and 42DD, will supply hydraulic fluid equally to extend and retract ports of the actuator 20B and thus be self-cancelling such that no movement results. Pushing the joystick to just above that midway point will lift the driver's side of the wheel support 16 at a slow rate since the hydraulic fluid supplied to a retract port of actuator 20B just slightly overpowers the hydraulic fluid supplied to the extend port of the actuator.

Advantageously, the single joystick 42 may control both actuators 18R and 18L so as to simplify the task of the operator. Also, the joystick 42 and associated valves 48 constrain the apparatus such that it is impossible to extend one of the actuators (20F or 20B), while retracting the other of the actuators. This constraint on the apparatus simplifies the control and valve arrangements from might otherwise be required.

Figure 4:
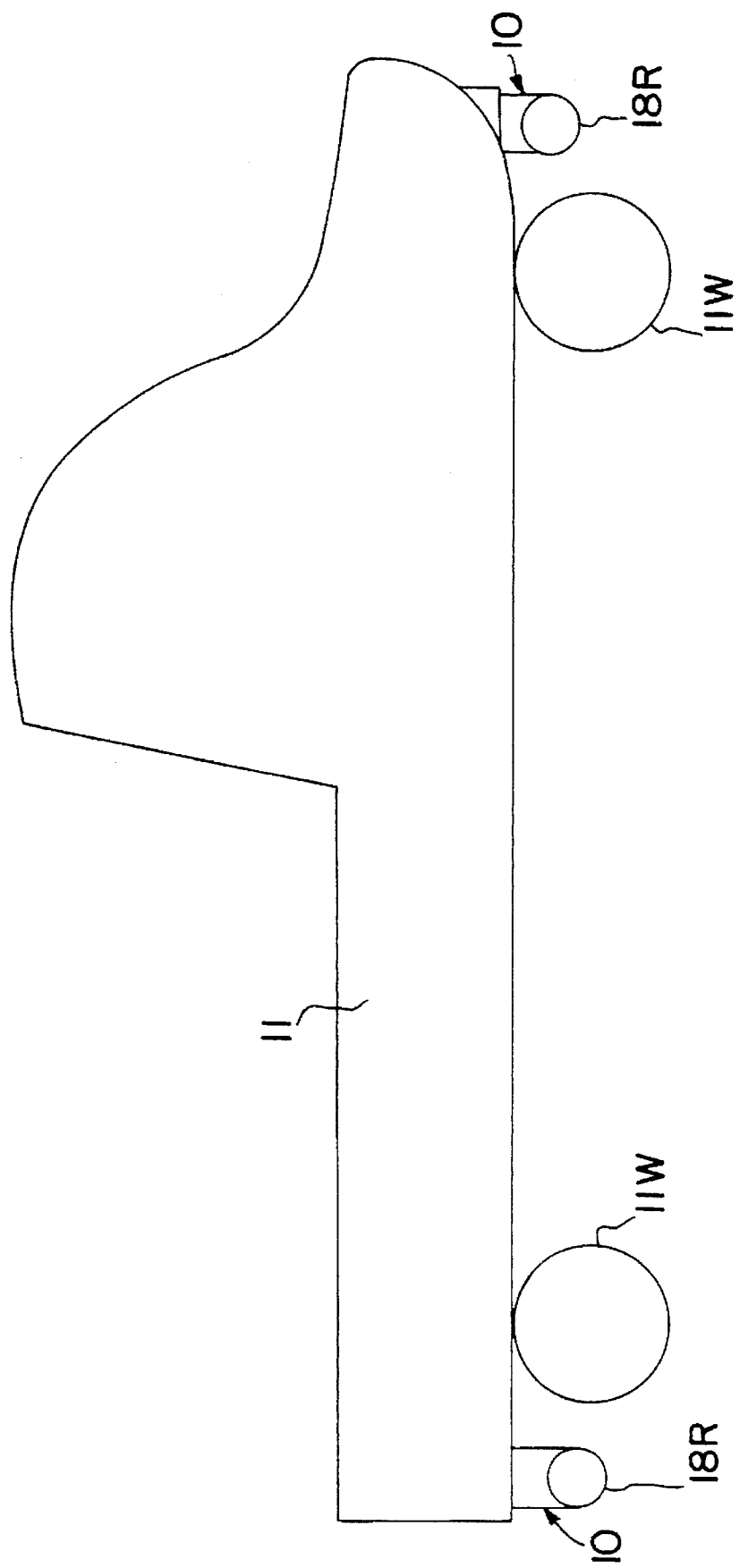
FIG. 4 is a simplified side view of a road vehicle using the rail guide wheel apparatus of the present invention.

FIG. 4 shows a road vehicle 11 with road wheels 11W and with front and back units corresponding to the apparatus 10 as described. Since the apparatuses 10 lower rail wheels such as 18R without moving them or their wheel support in the rail direction (right or left in FIG. 4), there is know need for extra clearances in front or back of the apparatuses 10. Further, there is less chance that moving portions of each of the rail guide wheel apparatuses will catch or interfere with other mechanisms. Instead, the rail wheels and their supports may be lowered vertically (straight down) or, if necessary, may be side shifted (moved into or out of the FIG. 4 plane of view) in order to line the rail wheels up with rails, not shown, therebelow.

Figure 5:
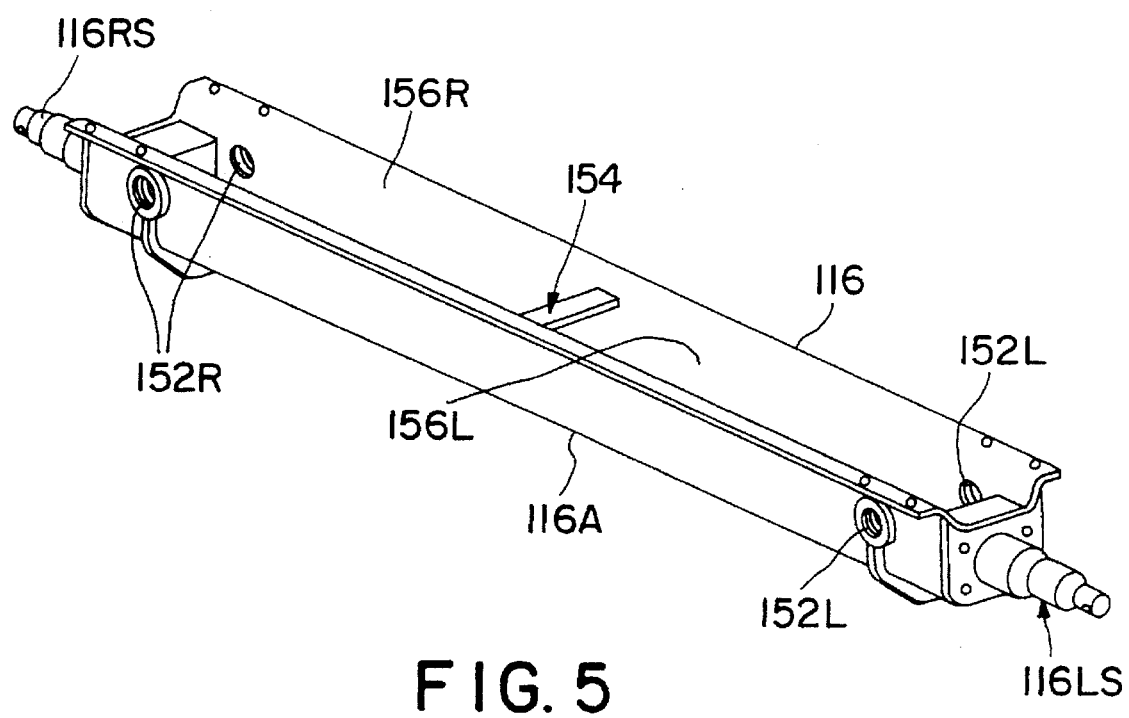
FIG. 5 is a perspective view of a U axle which may be used for improved ground clearance.
Figure 6:
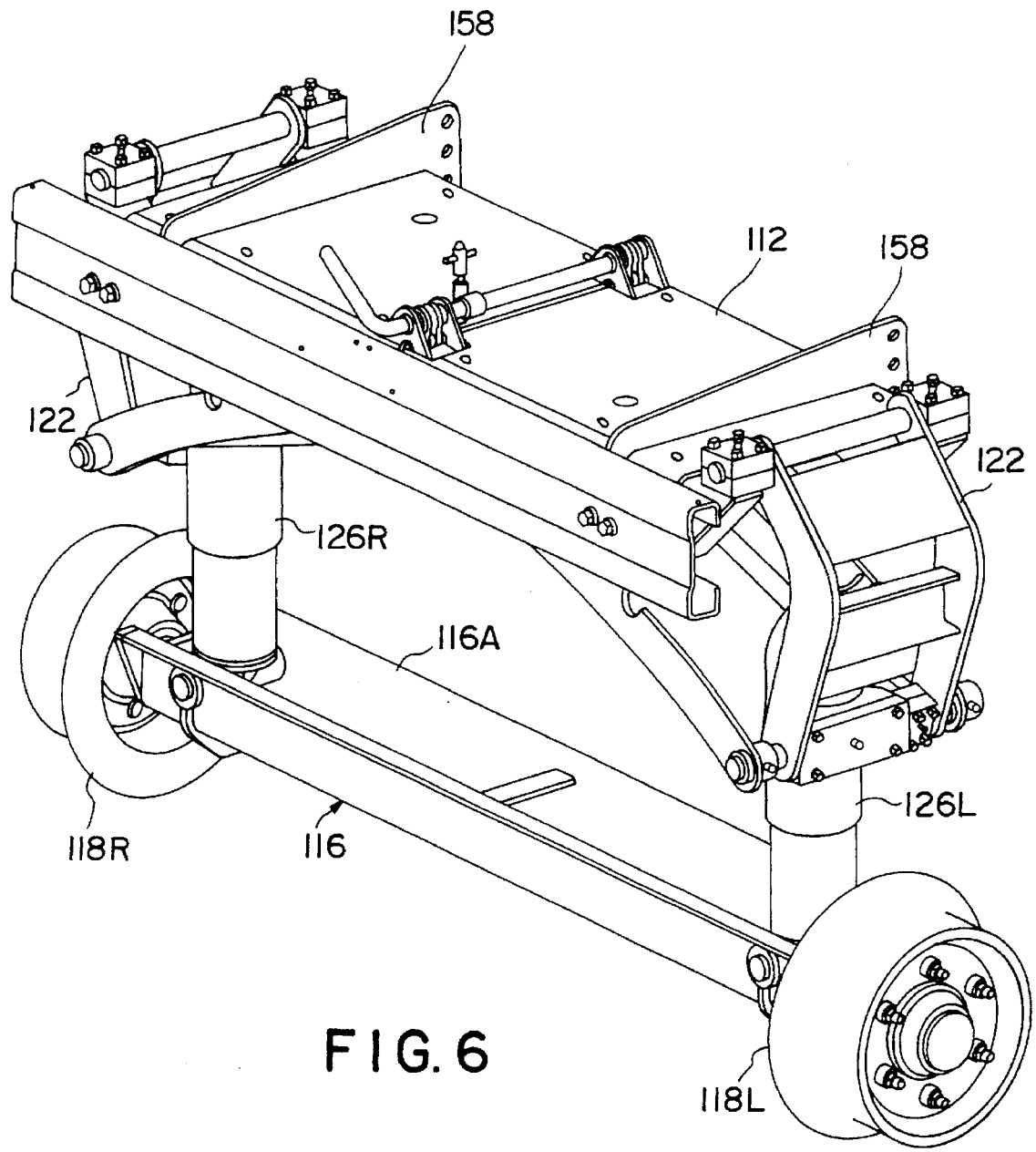
FIG. 6 is a perspective view of an apparatus using the U axle.

FIG. 5 shows an alternate wheel support 116 including a U section axle 116A which is useful for improving the ground clearance of the apparatus when it is in the highway or road mode with rail wheels retracted. The components in FIG. 5 are in the 100 series with the same last two digits as the corresponding component, if any, of the apparatus of FIGS. 1 and 2. Spindles 116RS and 116LS are used to mount rail wheels (wheels not shown in FIG. 5). Axle 116 has right and left holes 152R and 152L for accommodating a pivot pin (not shown) of corresponding right and left spring cells (not shown). Unlike the FIG. 2 arrangement where the spring cells 26R and 26L are disposed above the wheel support 16 when the apparatus is in highway mode with rail wheels retracted, the FIG. 5 embodiment has right and left cavities 156R and 156L in which the spring cells are disposed when the apparatus using axle 116A is placed in its road or highway mode. By having spring cells fold to within the cavities 156R and 156L on opposite sides of center reinforcement 154, the ground clearance is improved.

Figure 7A:
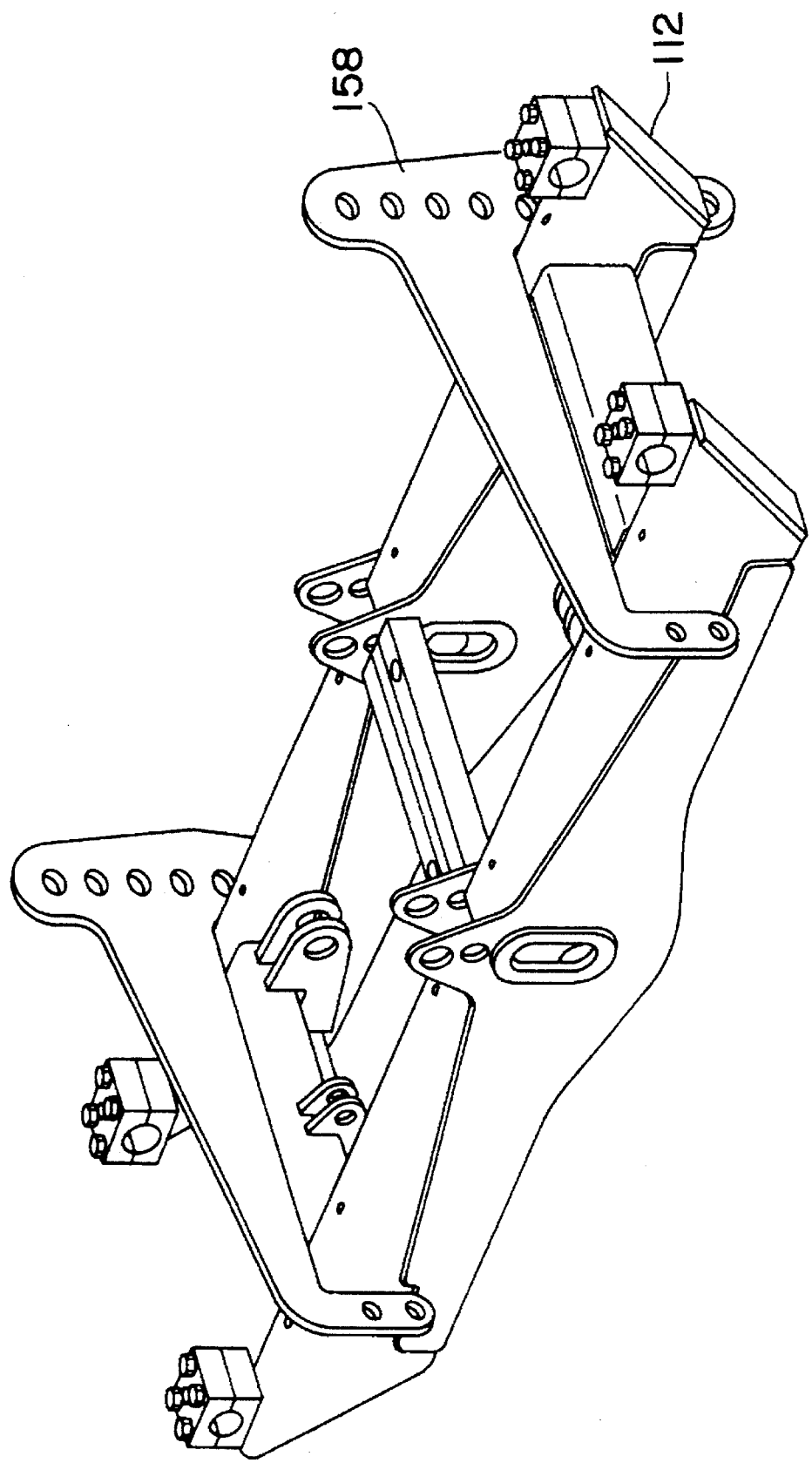
FIG. 7A is a perspective of a top parts of the apparatus of FIG. 6 with some parts removed for simplicity.
Figure 7B:
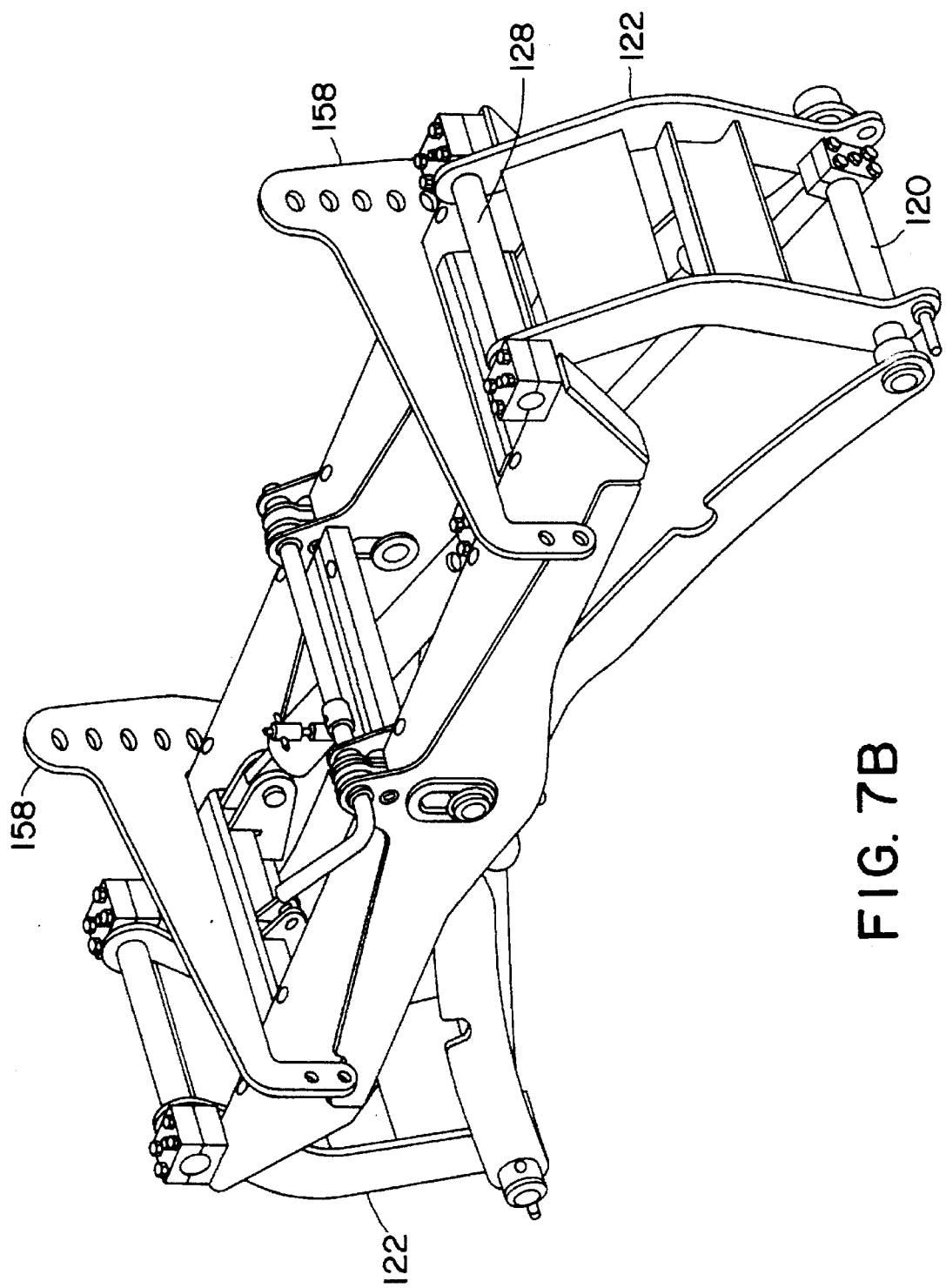
FIG. 7B is a perspective of a top parts of the apparatus of FIG. 6 with various lock mechanisms engaged.
Figure 8:
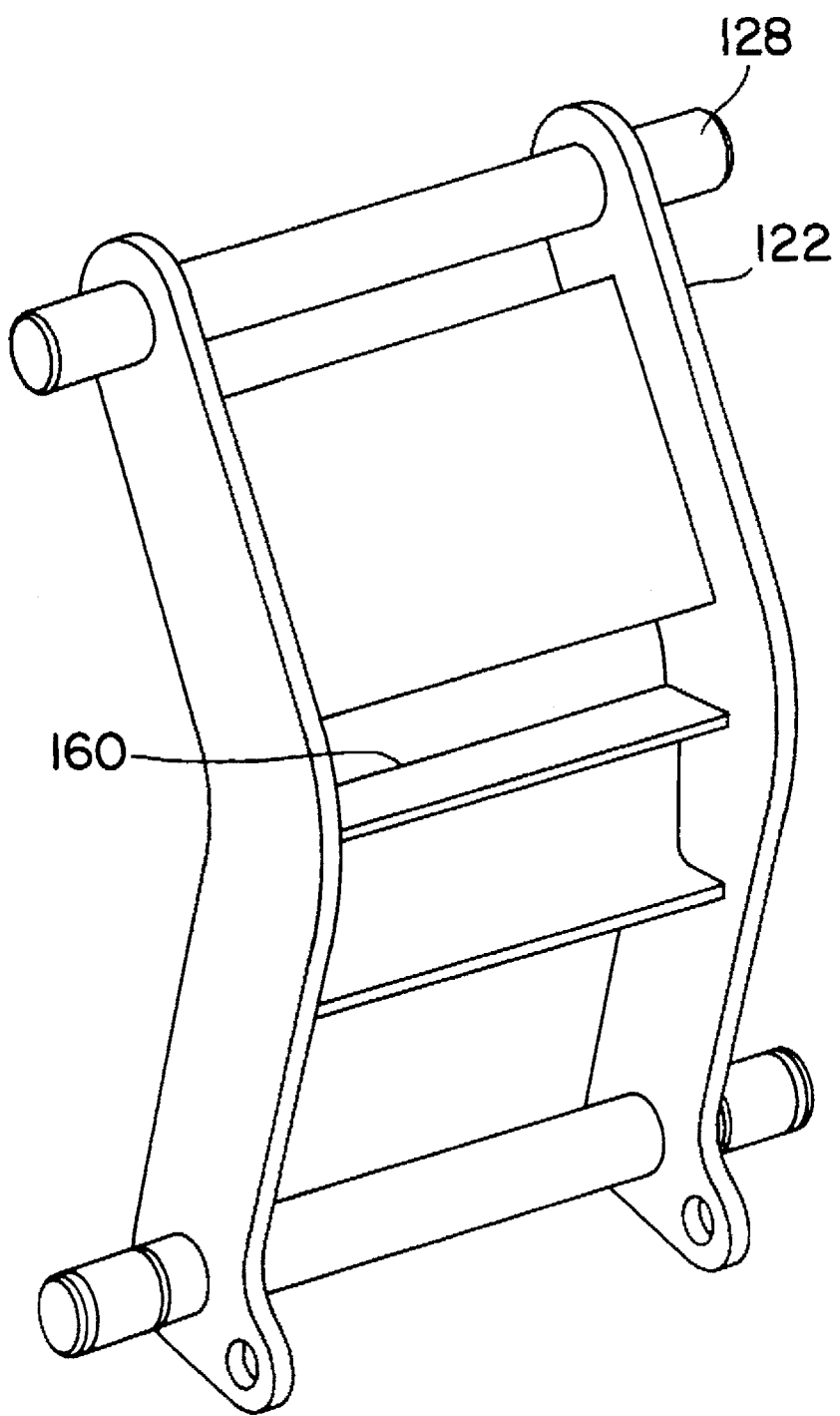
FIG. 8 is a perspective of a link used with the FIG. 6 apparatus.
Figure 9:
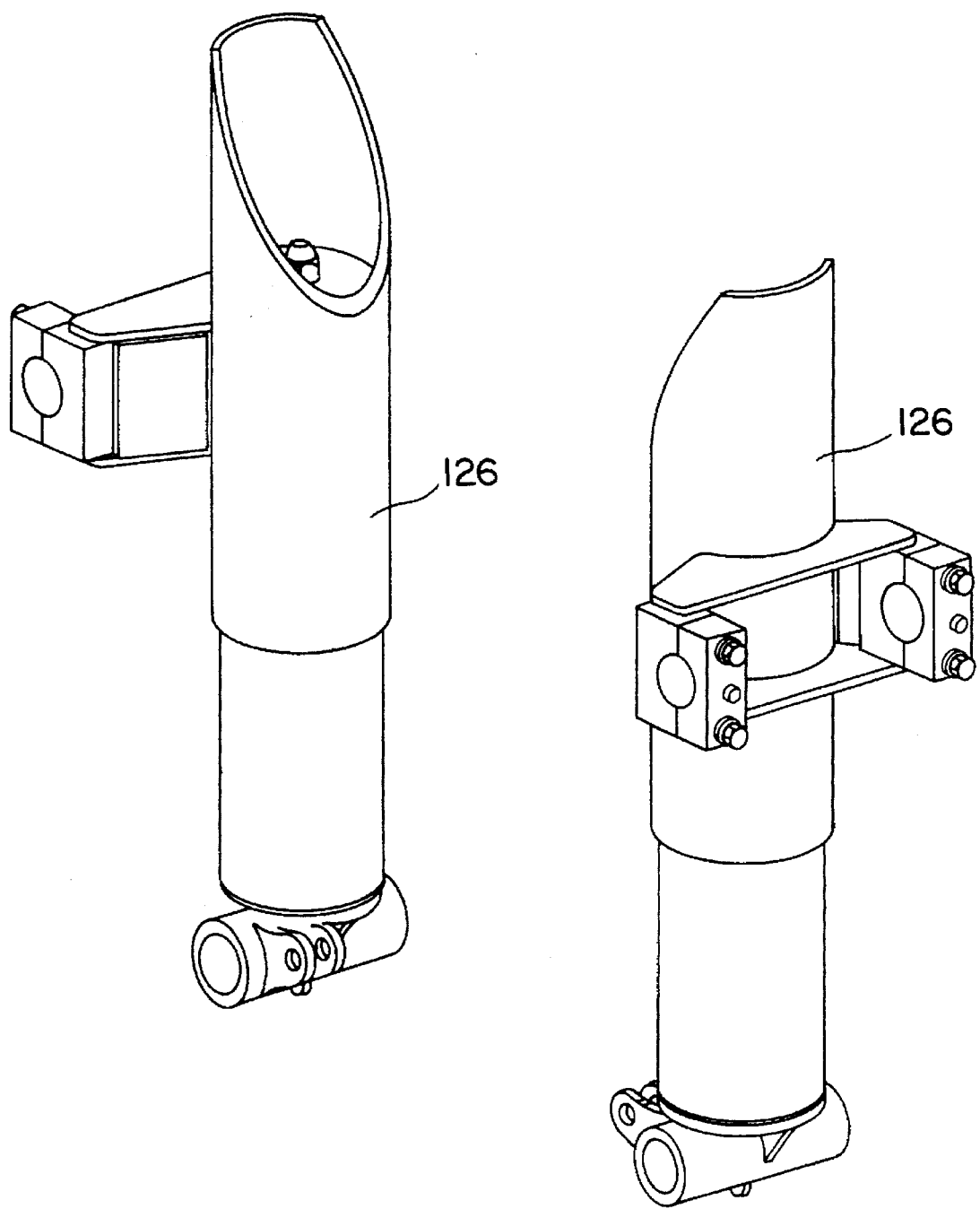
FIG. 9 is a perspective of spring cells used with the FIG. 6 apparatus.
Figure 10A:
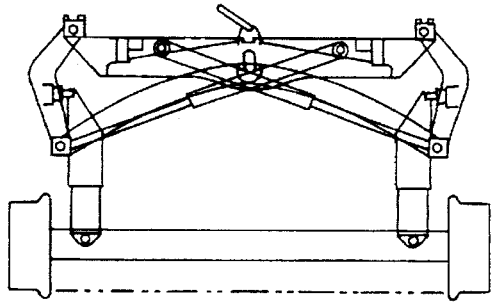
FIGS. 10A to 10E are simplified front views of the FIG. 6 apparatus moving from its rail position to its road position.
Figure 10B:
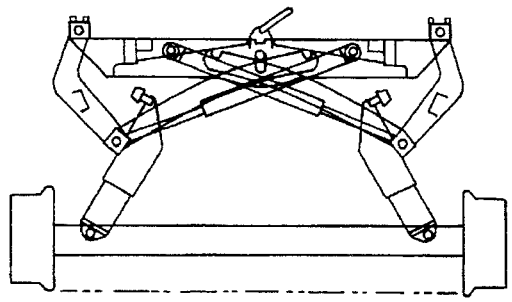
Figure 10C:
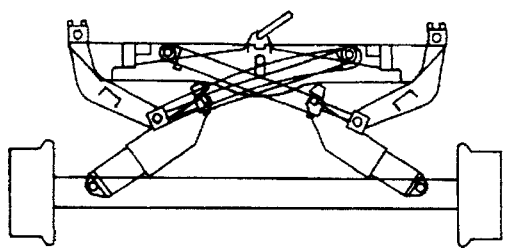
Figure 10D:
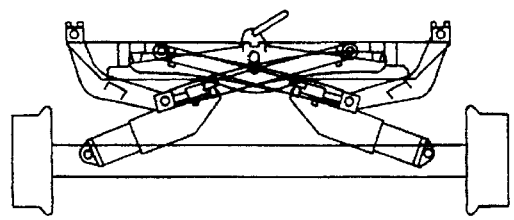
Figure 10E:
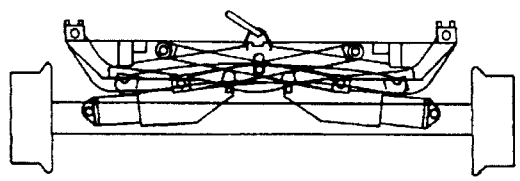
Figure 11:
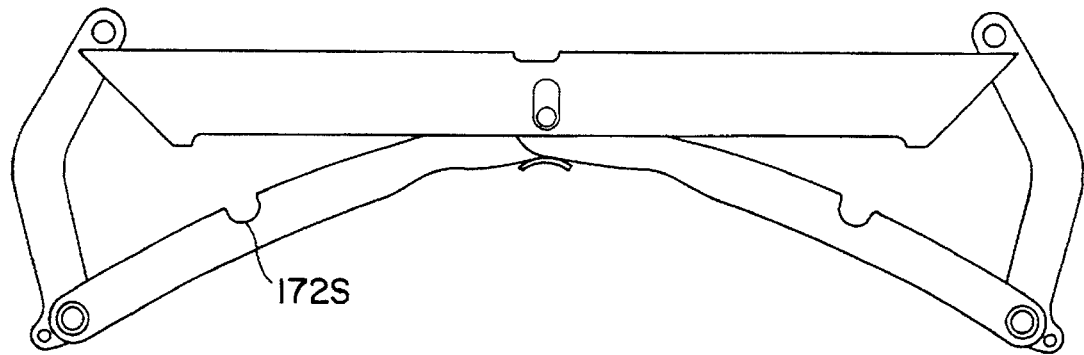
FIGS. 11 and 12 are front views of lock mechanisms used with the FIG. 6 arrangement.
Figure 12:
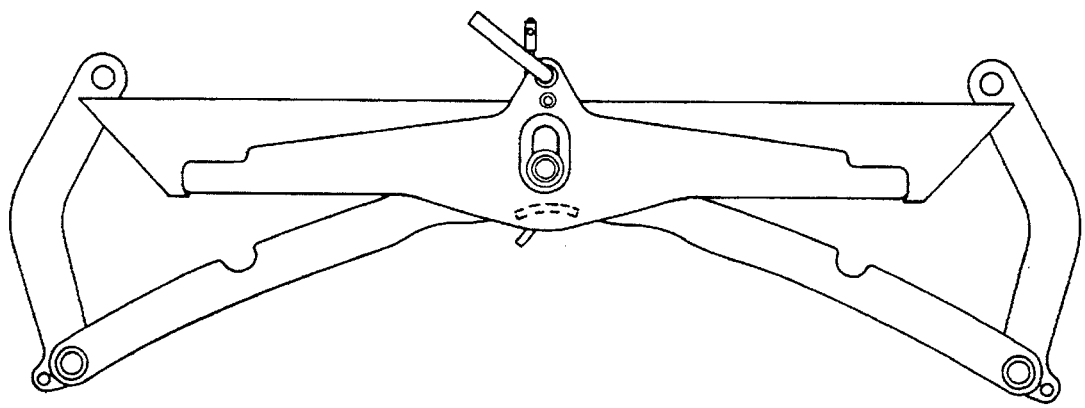
Figure 13:
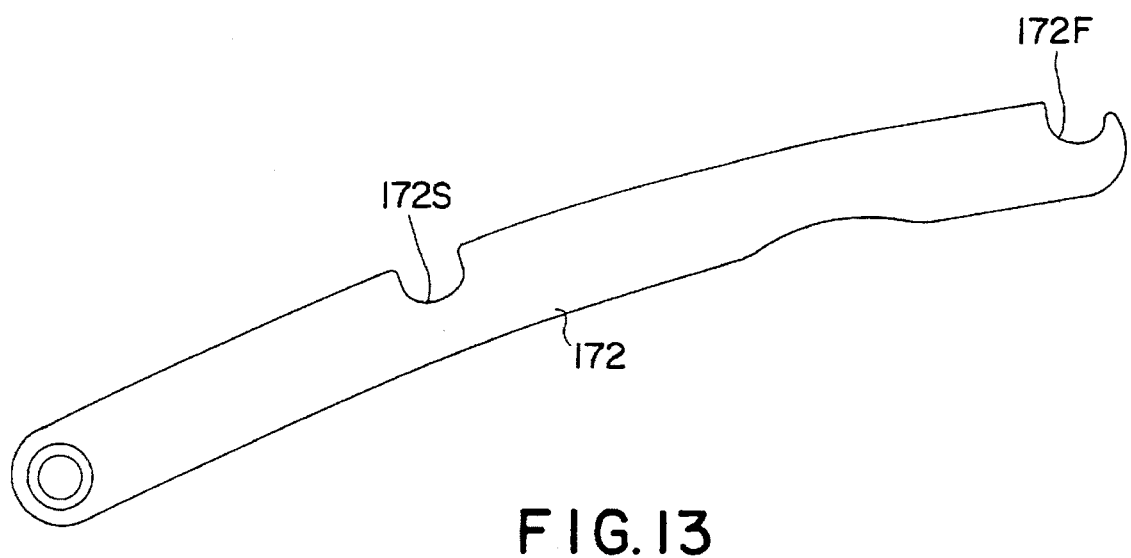
FIG. 13 is a front view of a sliding lock arm.

Turning now to FIGS. 6, 7A, 7B, 8, and 9, the alternate embodiment apparatus 110 using axle 116A, wheels 118R and 118L, and spring cells 126R and 126L will be described. The mount frame 112 includes plates 158 to allow mounting of frame 112 in proper position for a given vehicle. Actuating links 122, as shown in FIG. 8, have an upper axle 128 and lower axle 130 as well as contact area 160 for mounting a rubber bumper, not shown. The rubber bumper at the contact area serves for contacting the top of the spring cells 126 of FIG. 9.

FIGS. 10A through 10E show the apparatus moving from the rail position to the road position. In the road position of 10E, the spring cells are substantially disposed within the U axle, whereas at least part of the substantial portions are outside of the axle when the wheel support is in its lower position of 10A.

Continuing to view FIGS. 7A and 7B, and also considering FIGS. 11-16, apparatus 110 will be further discussed. Initially, it is noted that the apparatus 110 is locked in either road or rail positions (rail wheels up or down) by two lock arrangements. The primary locks relate to the use of pilot operated check valves located on each of the two hydraulic cylinders, such pilot operated check valves being well known. The secondary locking arrangement is a mechanical locking arrangement discussed below.

Figure 16:
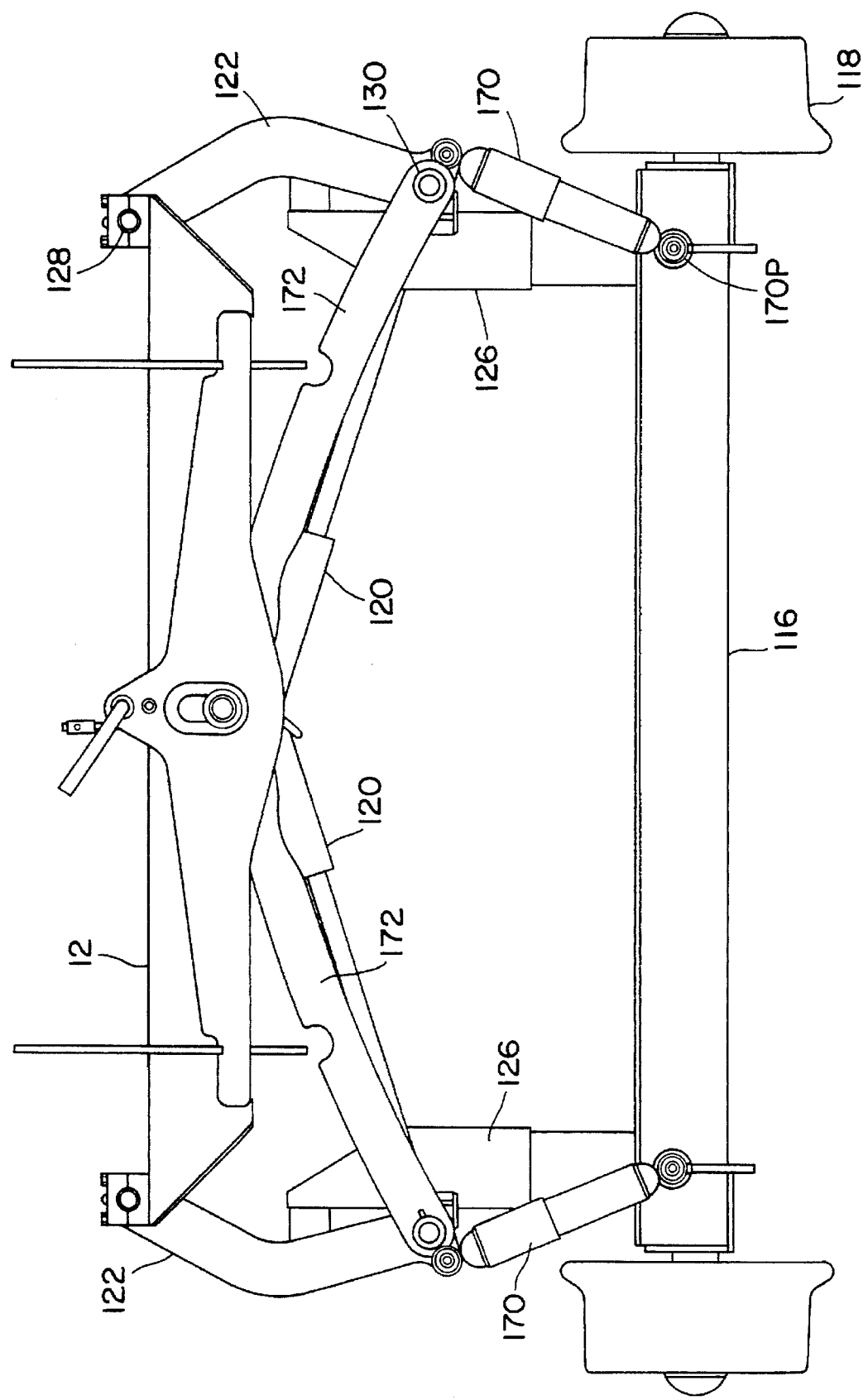
FIG. 16 is a front view of the apparatus of FIG. 6.

With special reference to FIG. 16, links 122 are moved by actuators 120 as are spring cells 126. The operation is quite similar to that described in detail for the FIG. 1 arrangement such that the discussion will concentrate on the differences. Hydraulic dampers 170 extend between lower pivot points 170P and upper pivot points on the links 122.

Figure 14:
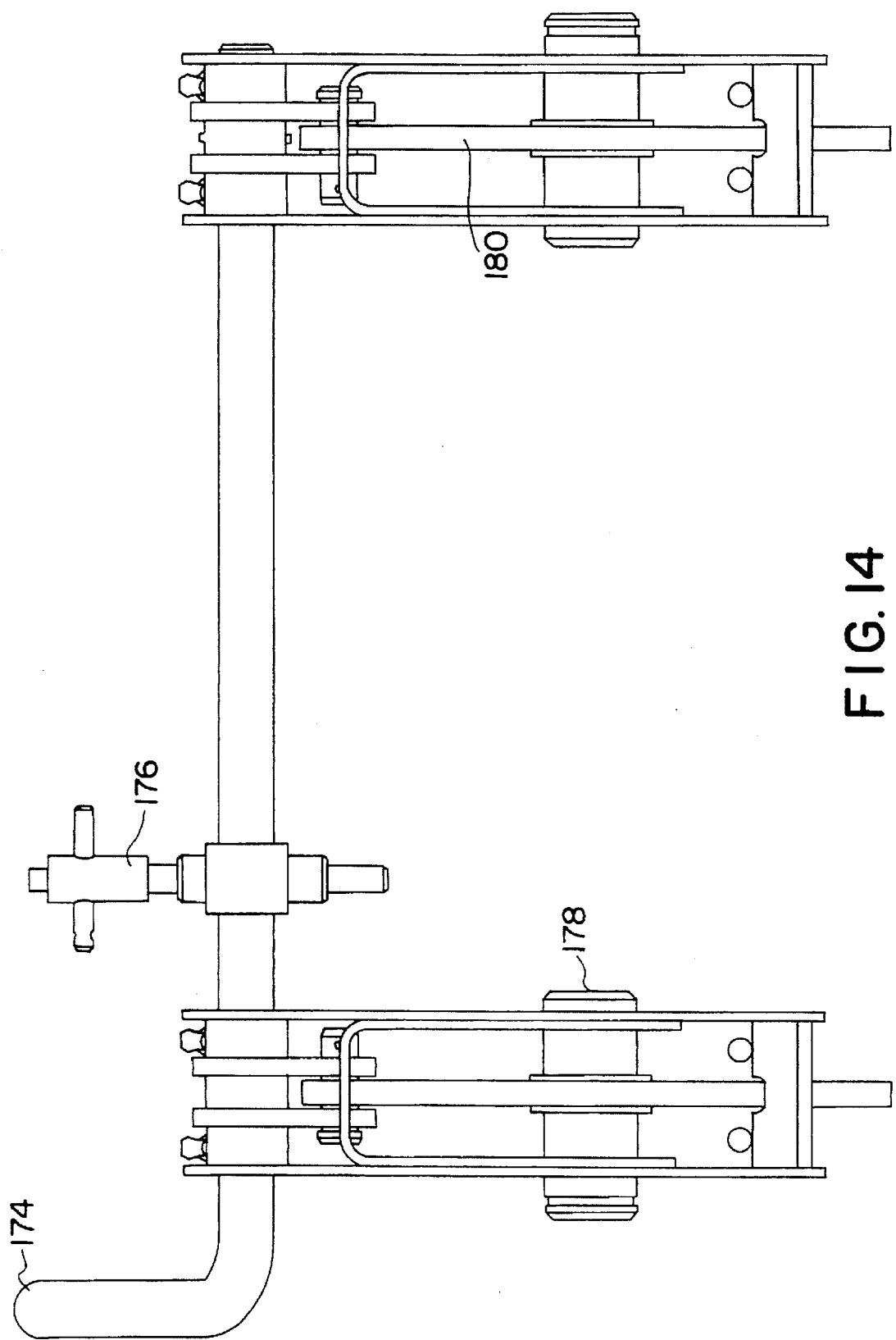
FIG. 14 is a side view of the lock mechanism used with the FIG. 6 arrangement.
Figure 15:
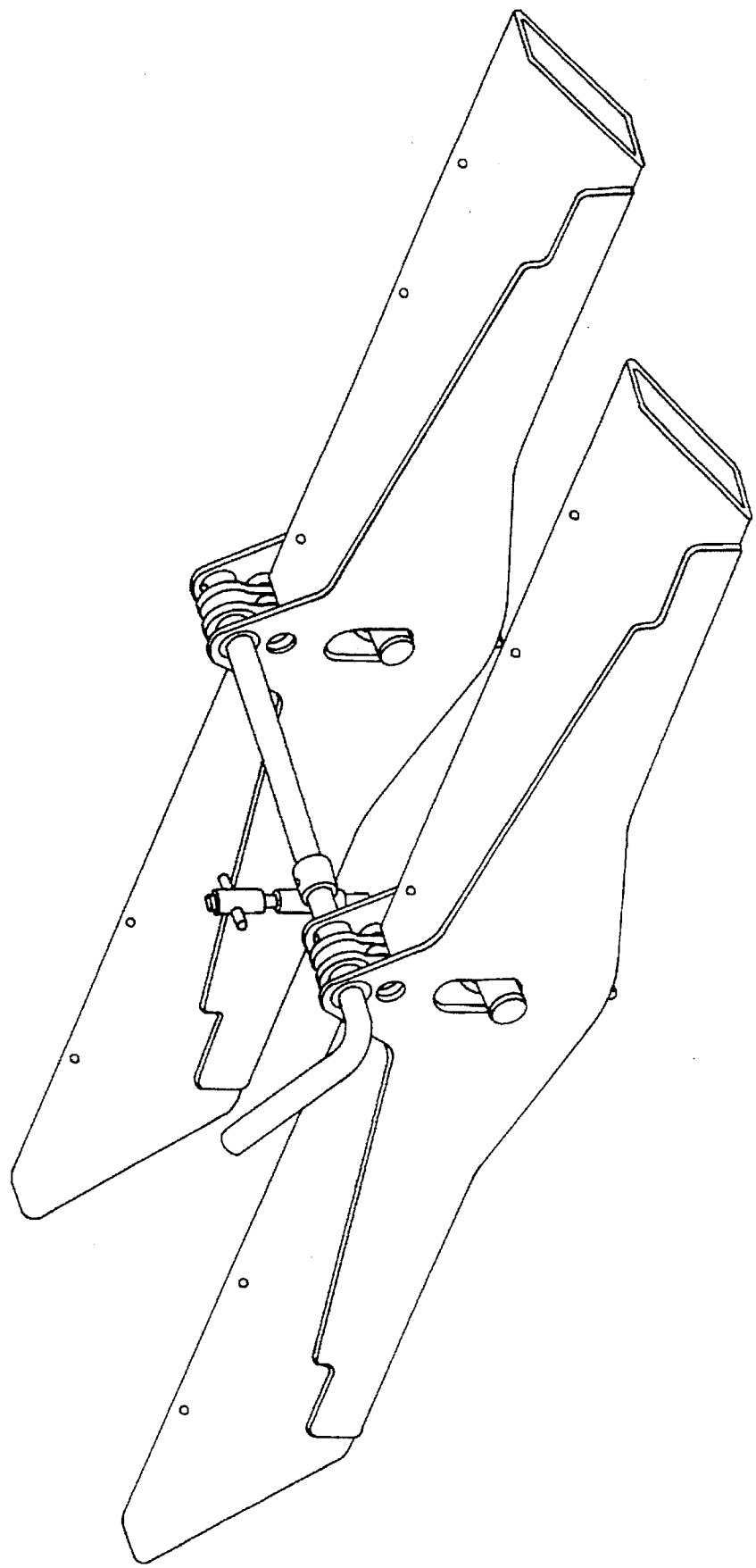
FIG. 15 is a perspective view of the lock mechanism used with the FIG. 6 arrangement.

Four sliding lock arms 172 are used for the mechanical lock arrangement. The arms slide into the bottom of the structural members of the frame and each arm has two slots in it. One slot 172F is for the rail position and the other slot 172S is for the road position. A pin that is moved by a hand lever drops into the appropriate slot and secures the arm in the desired position. With reference to FIG. 14, a lock lever 174 is secured by quick release pin 176. Lock pin 178 and lock pin lifting arm 180 are lifted by rotating lever 174 after removing the pin 176.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A rail guide wheel apparatus for a road vehicle having road wheels comprising:
    a mount frame adapted to be mounted to the road vehicle and having opposite first and second ends;
    a wheel support having first and second rail wheels mounted at opposite respective first and second ends thereof, said wheel support supported by said mount frame to allow relative movement therebetween; and
    a mode activator supported by said mount frame and operable to move said wheel support between:
        I. a lower position in which said first and second rail wheels engage rails; and
        II. an upper position in wherein said first and second rail wheels are sufficiently raised for allowing the road vehicle to travel on a road; and
    wherein said mode activator includes extendable first and second actuators for changing said wheel support between its lower and upper positions, said first actuator having a wheel support end operably connected adjacent said first end of said wheel support and having a frame end operably connected adjacent said second end of said mount frame, said second actuator having a wheel support end operably connected adjacent said second end of said wheel support and having a frame end operably connected adjacent said first end of said mount frame, and wherein said first and second actuators extend across each other when viewed in a rail direction.

2. The rail guide wheel apparatus of claim 1 further comprising:
    a suspension operably connecting said wheel support to said mount frame, said suspension serving as a suspension for the vehicle only when said first and second rail wheels are engaged to rails.

3. The rail guide wheel apparatus of claim 2 wherein said mode activator is operable to vertically move said wheel support between its lower and upper positions, which vertical movement of said wheel support between its lower and upper positions corresponds respectively to movement of said suspension between:
    an operating mode in which said suspension is oriented relative to said wheel support such that said suspension dampens vibrations from engagement of said first and second rail wheels with rails; and
    a non-operating mode in which said suspension is oriented relative to said wheel support differently from its orientation in the operating mode.

4. The rail guide wheel apparatus of claim 1 further comprising:
    a joystick operably connected to control both of said first and second actuators for changing said wheel support between its upper and lower positions.

5. The rail guide wheel apparatus of claim 1 wherein said wheel support includes an axle having at least one lengthwise extending cavity therein, and further comprising:
    first and second members operably connecting said wheel support to said mount frame, each of said first and second members having substantial portions disposed within said axle when said wheel support is in its upper position, and wherein at least part of said substantial portions are outside of said axle when said wheel support is in its lower position.

6. The rail guide wheel apparatus of claim 1 wherein said first actuator has its frame end pivotably fixed to a point on said mount frame and said second actuator has its frame end pivotably fixed to a point on said mount frame.

7. The rail guide wheel apparatus of claim 6 further comprising first and second members operably connecting said wheel support to said mount frame and each having a lower end pivotably connected to said wheel support; and
    wherein said first actuator has its wheel support end pivotably connected to said wheel support by way of said first member, and wherein said second actuator has its wheel support end pivotably connected to said wheel support by way of said second member.

8. The rail guide wheel apparatus of claim 7 wherein each of said first and second members is a spring cell.

9. The rail guide wheel apparatus of claim 1 further comprising first and second links having upper ends respectively pivotably mounted at said first and second ends of said mount frame, said first link having a lower end pivotably connected to said wheel support end of said second actuator, and said second link having a lower end pivotably connected to said wheel support end of said first actuator.

10. The rail guide wheel apparatus of claim 1 combined with a road vehicle, said mount frame being mounted to said road vehicle.

11. A rail guide wheel apparatus for a road vehicle having road wheels comprising:
    a mount frame adapted to be mounted to the road vehicle;
    a wheel support having first and second rail wheels mounted at opposite respective first and second ends thereof, said wheel support supported by said mount frame to allow relative movement therebetween;
    a mode activator supported by said mount frame and operable to move said wheel support between:
        I. a lower position in which said first and second rail wheels engage rails; and II. an upper position in wherein said first and second rail wheels are sufficiently raised for allowing the road vehicle to travel on a road; and a suspension operably connecting said wheel support to said mount frame, said suspension serving as a suspension for the vehicle only when said first and second rail wheels are engaged to rails; and wherein said mode activator is operable to vertically move said wheel support between its lower and upper positions, which vertical movement of said wheel support between its lower and upper positions corresponds respectively to movement of said suspension between:

an operating mode in which said suspension is oriented relative to said wheel support such that said suspension dampens vibrations from engagement of said first and second rail wheels with rails; and a non-operating mode in which said suspension is oriented transversely relative to a rail direction.

12. The rail guide wheel apparatus of claim 11 wherein said mode activator includes extendable first and second actuators for changing said wheel support between its lower and upper positions, said first actuator having a wheel support end operably connected to said wheel support and having a frame end operably connected to said mount frame, said second actuator having a wheel support end operably connected to said wheel support and having a frame end operably connected to said mount frame; and further comprising:

a joystick operably connected to control both of said first and second actuators for changing said wheel support between its upper and lower positions.

13. The rail guide wheel apparatus of claim 11 wherein said suspension includes first and second spring cells, said first spring cell having a lower end pivotably connected to said first end of said wheel support, and said second spring cell having a lower end pivotably connected to said second end of said wheel support.

14. The rail guide wheel apparatus of claim 13 wherein said first spring cell is pivotably connected to said wheel support to pivot about a horizontal, rail direction first axis relative thereto, and said second spring cell is pivotably connected to said wheel support to pivot about a horizontal, rail direction second axis relative thereto.

15. The rail guide wheel apparatus of claim 14 wherein said wheel support includes an axle having at least one lengthwise extending cavity therein, and wherein each of said first and second spring cells have substantial portions disposed within said axle when said wheel support is in its upper position, and wherein at least part of said substantial portions are outside of said axle when said wheel support is in its lower position.

16. The rail guide wheel apparatus of claim 13 wherein said mode activator includes extendable first and second actuators for changing said wheel support between its lower and upper positions, said first actuator having a wheel support end operably connected to said wheel support and having a frame end operably connected to said mount frame, said second actuator having a wheel support end operably connected to said wheel support and having a frame end operably connected to said mount frame; and wherein said first actuator has its frame end pivotably fixed to a point on said mount frame and said second actuator has its frame end pivotably fixed to a point on said mount frame; and wherein said first actuator has its wheel support end pivotably connected to said wheel support by way of said second spring cell, and wherein said second actuator has its wheel support end pivotably connected to said wheel support by way of said first spring cell.

17. A rail guide wheel apparatus for a road vehicle having road wheels comprising:

a mount frame adapted to be mounted to the road vehicle and having opposite first and second ends;

a wheel support having first and second rail wheels mounted at opposite respective first and second ends thereof, said wheel support supported by said mount frame to allow relative movement therebetween; and a mode activator supported by said mount frame and operable to move said wheel support between:

I. a lower position in which said first and second rail wheels engage rails; and II. an upper position in wherein said first and second rail wheels are sufficiently raised for allowing the road vehicle to travel on a road; said mode activator includes extendable first and second actuators for changing said wheel support between its lower and upper positions, said first actuator having a wheel support end operably connected to said wheel support and having a frame end movably supported on said mount frame, said second actuator having a wheel support end operably connected to said wheel support and having a frame end movably supported on said mount frame; and an angular control device operably connected to control both of said first and second actuators for changing said wheel support between its upper and lower positions, said angular control device operable for side shifting of the wheel support in a direction transverse to the rail direction.

18. The rail guide wheel apparatus of claim 17 wherein the angular control device is a joystick.

19. The rail guide wheel apparatus of claim 17 wherein said angular control device comprises valve means for precluding (i) retraction of either of said first and second actuators during extension of the other of said first and second actuators and (ii) extension of either of said first and second actuators during retraction of the other of said first and second actuators.

20. The rail guide wheel apparatus of claim 17 wherein said first actuator has its wheel support end operably connected adjacent said first end of said wheel support and has its frame end operably connected adjacent said second end of said mount frame, said second actuator has its wheel support end operably connected adjacent said second end of said wheel support and has its frame end operably connected adjacent said first end of said mount frame, and wherein said first and second actuators extend across each other when viewed in a rail direction.

21. The rail guide wheel apparatus of claim 20 further comprising a suspension operably connecting said wheel support to said mount frame, said suspension serving as a suspension for the vehicle only when said first and second rail wheels are engaged to rails, and wherein said mode activator is operable to vertically move said wheel support between its lower and upper positions, which vertical movement of said wheel support between its lower and upper positions corresponds respectively to movement of said suspension between:

an operating mode in which said suspension is oriented relative to said wheel support such that said suspension dampens vibrations from engagement of said first and second rail wheels with rails; and a non-operating mode in which said suspension is oriented relative to said wheel support differently from its orientation in the operating mode.

22. A rail guide wheel apparatus for a road vehicle having road wheels comprising:

a mount frame adapted to be mounted to the road vehicle;

a wheel support having first and second rail wheels mounted at opposite respective first and second ends thereof, said wheel support supported by said mount frame to allow relative movement therebetween, wherein said wheel support includes an axle having at least one lengthwise extending cavity therein;

a mode activator supported by said mount frame and operable to move said wheel support between:
- I. a lower position in which said first and second rail wheels engage rails; and
- II. an upper position in wherein said first and second rail wheels are sufficiently raised for allowing the road vehicle to travel on a road; and first and second members operably connecting said wheel support to said mount frame, each of said first and second members having substantial portions disposed within said axle when said wheel support is in its upper position, and wherein at least part of said substantial portions are outside of said axle when said wheel support is in its lower position.

23. The rail guide wheel apparatus of claim 22 wherein said first member is a first spring cell and said second member is a second spring cell.

24. The rail guide wheel apparatus of claim 23 wherein said mode activator is operable to vertically move said wheel support between its lower and upper positions, which vertical movement of said wheel support between its lower and upper positions corresponds respectively to movement of said each of said first and second spring cells between:

an operating mode in which each of said first and second spring cells is oriented relative to said wheel support to dampen vibrations from engagement of said first and second rail wheels with rails; and a non-operating mode in which each of said first and second spring cells is oriented relative to said wheel support differently from its orientation in the operating mode.

25. The rail guide wheel apparatus of claim 22 wherein said mode activator includes extendable first and second actuators for changing said wheel support between its lower and upper positions, said first actuator having a wheel support end operably connected to said wheel support and having a frame end operably connected to said mount frame, said second actuator having a wheel support end operably connected to said wheel support and having a frame end operably connected to said mount frame.

26. The rail guide wheel apparatus of claim 22 wherein said first actuator has its wheel support end operably connected adjacent said first end of said wheel support and has its frame end operably connected adjacent said second end of said mount frame, said second actuator has its wheel support end operably connected adjacent said second end of said wheel support and has its frame end operably connected adjacent said first end of said mount frame, and wherein said first and second actuators extend across each other when viewed in a rail direction.

27. The rail guide wheel apparatus of claim 26 further comprising:

an angular control device operably connected to control both of said first and second actuators for changing said wheel support between its upper and lower positions.

* * * * *